US006162550A

United States Patent [19]

Pinchen et al.

[11] Patent Number: 6,162,550

[45] **Date of Patent: *Dec. 19, 2000**

[54] TAGGING MATERIAL

[75] Inventors: Stephen Paul Pinchen, Etwall; Andrew Dean, Swanwick; Gary Brooks, Alfreton, all of United Kingdom

[73] Assignee: P. P. Payne Limited, Nottingham, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 09/039,840

[22] Filed: Mar. 16, 1998

Related U.S. Application Data

[63] Continuation of application No. 08/832,121, Apr. 3, 1997, which is a continuation of application No. 08/401,358, Mar. 9, 1995, abandoned.

[30] Foreign Application Priority Data

Mar. 11, 1994 [GB] United Kingdom ................... 9404775

[51] Int. Cl.[7] ............................ B32B 15/08; G08B 13/00

[52] U.S. Cl. .......................... 428/624; 428/611; 428/625; 428/626; 428/344; 428/352; 428/461; 428/906; 340/572.1; 340/551

[58] Field of Search ..................................... 428/622, 623, 428/624, 625, 626, 611, 928, 344, 461, 40.1, 40.9, 41.8, 352, 906; 340/551, 572

[56] References Cited

U.S. PATENT DOCUMENTS

| | | | |
|---|---|---|---|
| 2,776,068 | 1/1957 | Johnson | 216/21 |
| 2,972,428 | 2/1961 | Dubbs | 216/25 |
| 4,342,904 | 8/1982 | Onsager | 235/493 |
| 4,354,894 | 10/1982 | Lewis et al. | 156/517 |
| 4,568,921 | 2/1986 | Pokalsky et al. | 340/572 |
| 4,844,962 | 7/1989 | May et al. | 428/443 |
| 4,849,736 | 7/1989 | Cordery | 340/551 |
| 4,910,499 | 3/1990 | Benge et al. | 340/572.3 |
| 4,953,430 | 9/1990 | Hong | 156/517 |
| 5,029,291 | 7/1991 | Zhou et al. | 340/572 |
| 5,121,103 | 6/1992 | Minasy et al. | 340/551 |
| 5,126,270 | 6/1992 | Minkley, Jr. | 435/320.1 |
| 5,181,021 | 1/1993 | Lee et al. | 340/572 |
| 5,206,626 | 4/1993 | Minasy et al. | 340/572 |
| 5,304,983 | 4/1994 | Zhou et al. | 340/572 |
| 5,405,702 | 4/1995 | Piotrowski et al. | 428/458 |
| 5,477,219 | 12/1995 | Zerembo et al. | 340/572 |

FOREIGN PATENT DOCUMENTS

| | | |
|---|---|---|
| 0123557 | 4/1984 | European Pat. Off. . |
| 0121371 | 10/1984 | European Pat. Off. . |
| 0123557 | 10/1984 | European Pat. Off. . |
| 0121371 | 6/1988 | European Pat. Off. . |
| 0316811 | 5/1989 | European Pat. Off. . |
| 0577241 | 1/1994 | European Pat. Off. . |
| 0578992 | 1/1994 | European Pat. Off. . |

OTHER PUBLICATIONS

K.H. Shin et al., Asymmetric Hystersis Loops in CoObased Ferromagnetic Allys, Sep., 1992, p. 2772 IEEE Trans etc.

K.H. Shin et al., Asymmetric Hysteresis Loops in Co–Based Ferromagnetic Alloys, Sep., 1992, p. 2772 IEEE Trans. etc.

*Primary Examiner*—Deborah Jones
*Assistant Examiner*—Stephen Stein
*Attorney, Agent, or Firm*—Seyfarth Shaw

[57] ABSTRACT

A tagging material comprises a pressure sensitive adhesive tape incorporating electromagnetic sensor material whose presence can be detected. Tags are cut from the tagging material as the tagging material and articles are conveyed along converging paths and are adhered to the articles by the adhesive of the tape by means of apparatus comprising a tagging material feeding means and an applicator head.

4 Claims, 9 Drawing Sheets

TAGGING MATERIAL

This is a continuation of pending prior application Ser. No. 08/832,121, filed on Apr. 3, 1997, of Stephen Paul Pinchen, Andrew Dean and Gary Brooks, entitled IMPROVEMENTS IN OR RELATING TOARTICLE TAGGING, which, in turn, is a file wrapper continuation of application Ser. No. 08/401,358, filed Mar. 9, 1995, now abandoned.

BACKGROUND OF THE INVENTION

Field of the Invention

This invention relates to article tagging and more particularly is concerned with applying tags to articles whereby their presence can be detected by electronic article surveillance techniques.

Detailed of the Prior Art

It is known for retail stores to provide certain of their articles for sale with tags formed of electromagnetic sensor material which can be detected by detection equipment. Ordinarily, at the point of sale, the cashier removes the tag from the article. Alternatively, the cashier deactivates the tag or by-passes the detection equipment. If, however, a thief attempts to avoid the cashier with the intention of stealing the article, he must necessarily pass the detection equipment which detects the presence of the tag and sounds an alarm. Hitherto, the tags have generally been applied, at the store, either manually or using a hand operated applicator of the type used to apply pressure sensitive adhesive labels. Such applicators are used in conjunction with a carrier tape in the form of a siliconised release paper or liner carrying detectable devices which are transferred from the carrier tape to the articles by the applicator. Thus is particularly time-consuming and expensive. Thus, only those articles which are of particularly high value such as clothes, compact discs, videos, perfumes, books and spirits tend to be tagged. However, the tags are usually fairly conspicuous and hence can be removed by the thief.

Attempts have been made to provide the articles with tags at source i.e. during the production of the article or during the production of the packaging for the article or at a time when the article is being packaged. These attempts have essentially involved motorising a pressure sensitive adhesive labeller of the above type. However such a system is still expensive because of the need to separate the detectable devices from the carrier tape, wind up the carrier tape from which the detectable devices have been removed, and apply the devices to the articles. Further, the system could, at best, apply 3 or 4 devices per second and hence the article production or article packaging line had to be slowed down with attendant cost disadvantages.

SUMMARY OF THE INVENTION

It is an object of the present invention to enable articles to be provided with tags at source automatically, cheaply and rapidly.

According to one aspect of the present invention there is provided a tagging material for the production of a tag for securing to an article to enable the presence of the article to be detected, which tagging material is in the form of a pressure sensitive adhesive tape having a first surface coated with pressure sensitive adhesive composition and a second surface opposite the first surface coated with release agent, the tape including a continuous substrate of synthetic plastics material and a continuous electromagnetic sensor material capable of being detected by detection equipment.

In accordance with one embodiment, the electromagnetic sensor material is adhered to the substrate by the pressure sensitive adhesive composition.

In this case, the electromagnetic sensor material may be in the form of a ribbon having a high magnetic permeability and low coercivity such as Permalloy metal and certain amorphous alloys of iron, nickel or cobalt which, when exposed to a continuous alternating magnetic interrogation field, is driven successively into and out of magnetic saturation by the alternating magnetic interrogation field. This results in a disturbance of the interrogation field such that other magnetic fields are produced at frequencies harmonically related to the interrogation field. The signal represented by these other fields can then be detected. It is particularly preferred for the material of the ribbon to be such that it can be activated so that it reacts in the above way when subjected to such an alternating magnetic interrogation field and then be subsequently deactivated so as not to react in that way. Switchable materials of this type are well known in the art and are described in, for example, U.S. Pat. No. 5,029,291, No. 5,121,103, No. 5,206,626, No. 5,304,983 and No. 5,126,270 and also in an article by K H Shin, C D Graham Jr. and P Y Zhou entitled Asymmetric Hysteresis Loops in Cobalt-based Ferromagnetic Alloys at page 2772 of IEEE Transactions on Magnetics, September 1992 (all of which are incorporated herein by reference).

In an alternative embodiment, the electromagnetic sensor material may be of the type incorporating thin film technology. For example, the sensor material may comprise a thin continuous metal film and a perforate metal film adhered to either side of a film of synthetic plastics material. The perforate metal film is then laminated to one face of the substrate, the release agent is coated on the opposite face of the substrate and the pressure sensitive adhesive composition is coated on the continuous metal film. Such materials are, for example, marketed by Esselte Meto. As in the previous embodiment, the electromagnetic sensor material includes Permalloy or amorphous metal alloys.

The substrate of the pressure sensitive adhesive tape will ordinarily be in the form of a thin base film of synthetic plastics material having a thickness of, for example, from 30 to 60 microns and a width of from 2 to 10 mm and preferably not less than 4 mm. The plastics material of the base film is generally oriented either monoaxially or biaxially and any thermoplastic plastics material may be used for the base film provided that it has adequate strength and dimensional stability. Preferably, the base film is formed of monoaxially oriented polypropylene or polyester.

Any suitable pressure sensitive adhesive composition may be used. Thus, it may, for example, be based on natural or synthetic rubber or on acrylic copolymers. Preferably the adhesive is a natural rubber resin solvent based system although aqueous or solvent based acrylic copolymers can be used.

Normally a primer coating is provided between the pressure sensitive adhesive composition and the surface of the base film so as to promote anchorage of the pressure sensitive adhesive composition. That surface of the base film which is not coated with the pressure sensitive composition is generally coated with a release agent such as a silicone release lacquer.

The tagging material of the first aspect of the invention may be produced by coating one of the surfaces of a web of the base film material with the pressure sensitive adhesive composition and the other of its surfaces with the release agent. The coated web is then slit longitudinally into wide strips in a first cutting stage and the strips are then slit longitudinally into narrow tapes in a second cutting stage. A plurality of spaced apart cutting edges is used at each cutting stage. Ribbons of the electromagnetic sensor material are fed to each of the wide strips as it is being cut at the second cutting stage so that a ribbon passes between each pair of adjacent cutting edges and is then effectively adhered to the resultant tapes by means of the pressure sensitive adhesive composition of the tapes. The tape is of a sufficient width that the ribbon does not cover all of the pressure sensitive adhesive composition so that sufficient adhesive surface is available to enable the tape to be wound up onto a reel and to be adhered to the article.

The tagging material can be traverse wound onto a reel in lengths of from 1,000 to 50,000 linear metres, preferably 25,000 metres. The material can be selfwound in that there is no need to include a release paper when winding the material onto a reel.

According to a second aspect of the present invention there is provided a method of providing an article with a means of enabling the presence of the article to be detected which method comprises the steps of:

(i) providing a tagging material as hereinbefore defined, (ii) causing an article to move along an article path, (iii) moving the tagging material along a tagging material path converging with the article path, (iv) severing a predetermined length from the tagging material to form a tag, and (v) adhering the tag to the article by means of the pressure sensitive adhesive composition.

When applying a tag to an article in accordance with this aspect of the invention, the article may be the product itself in which case the tag is directly applied to the product or the article may be packaging for the product in which case the article is applied to, or incorporated in, the packaging material. In any event, it is preferable that the tag is located such that it is not readily visible since otherwise it could be removed by the thief prior to reaching the point of sale. Thus, for example, the tag may be applied directly to the product and then be covered over by a label so that the tag cannot be seen. Alternatively, the tag can be applied to the back of the label before the label is applied to the product. In alternative embodiments, the tag may be incorporated in a carton in which the product is to be packaged for example in the side seam or the crash lock of the carton or the tag may be sandwiched between the two sheets which are normally laminated together to form the base board of blister packs.

In the case where the article to which the tag is to be applied is a discrete article, then a plurality of the articles may be moved along the article path so that each article receives a tag. Alternatively, if the article is a continuous web of packaging material, then a plurality of tags will be applied to the moving web at locations which are predetermined so that they are not impaired during subsequent cutting or folding operations.

By means of the method of the present invention, it is possible to apply tags to products as they are being produced in the production line or as they are being packaged in the packaging line at a rate of up to tags per second. Thus the production line or packaging line can continue to operate at high speed.

Generally, the tag will be in its deactivated form when applied to the article at source during product manufacture or packaging. Then, a plurality of such tagged articles may be placed on a pallet for transfer to the retail store. All the tags can then be bulk activated simultaneously as they are being supplied into the warehouse of the retail store having the necessary detection equipment so that the articles in the store are activated. Then, at the point of sale, the tag is deactivated so that it will not actuate the detection equipment located between the point of sale and the exit.

According to a third aspect of the present invention there is provided a means of applying a tag to an article which applying means comprises a means for feeding tagging material as hereinbefore defined to an applicator head and a means of feeding an article to said applicator head, wherein said applicator head comprises a detector for detecting the position of an article at the head; a means of severing, from the tagging material, a predetermined length to form a tag; and means for adhering the tag to the article by means of the pressure sensitive adhesive composition of the tag.

In a preferred embodiment of this third aspect of the present invention, the means for feeding the tagging material to the applicator head may be a dispenser of the type described in our European patent No. 0121371 for applying pressure sensitive adhesive tear tape to filmic packaging material.

The applicator head may comprise a means for feeding the tagging material towards a tag-applying roller which, when the article to be tagged is sensed to be in an appropriate position, causes an incremental encoder to actuate the tagging material feed means to such an extent that a predetermined and controlled length of the tagging material is fed towards the tag-applying roller and is then severed from the remainder of the tagging material to form the tag. As the tag is cut from the tagging material, it is applied to the article by being passed between the article and the tag-applying roller.

The severing means may be in the form of a guillotine or, more preferably, in the form of a rotary cutter including one or more cutting edges.

The tagging material feed means may be in the form of a pair of feed rollers. Preferably, however, the tagging material feed means includes a transport belt co-operating with a shoe or with another transport belt. In this case, the means of severing the tag from the tagging material is preferably a rotary cutter which may be linked to the transport belt so as to operate at the same speed or which may be driven by a separate motor controlled by an incremental encoder so that the length of tag cut from the tagging material can be varied.

In the case where the applicator head includes tagging material feed rollers, the applicator head may include a chamber through which the tagging material passes and positioned between the feed rollers and the tag-applying roller. A current of air is blown through the chamber so as to control the position of the free end of the tagging material after the tag has been cut from it.

The Following Example Illustrates the Invention

EXAMPLE

A web of monoaxially oriented polypropylene film having a thickness of about 40 $\mu$m was formed in conventional manner. One surface of the web was then coated with a release agent comprising 100 parts of Silcolease 425 (a 30% solids concentration of dimethyl polysiloxane and methyl hydrogen polysiloxane resins in toluene from Rhone Poulenc) together with 4 parts of Catalyst 62A and 4 parts of Catalyst 62B (50% solids concentration of aminoalkoxy-polysiloxane in toluene and alkyl tin acrylate in xylene, respectively from Rhone Poulenc). It was applied to give a dry coating weight of 0.25 g/m$^2$.

The other surface of the web was then coated with a primer and a transparent pressure sensitive adhesive composition. The primer was a solution in toluene of parts of natural crepe rubber and 8 parts of a cross-linking agent (Vulcabond Tex.) to give a coating weight of 0.25 gms per square metre. Vulcabond Tex. is manufactured by ICI and is a 50% solution of polyisocyanate (mainly diphenyl methane di-isocyanate) in xylene. The pressure sensitive adhesive composition was a solution of 100 parts natural crepe rubber, 110 parts of a tackifying resin having a melting point of 110/115° C. (Arkon P) and one part of an oxidant (Irganox) dissolved in a hydrocarbon mixture (SBP2). This was applied by a conventional reverse role coating technique to give a dry coating weight of 15 to 40 g/m$^2$. Arkon P is marketed by Arakara Chemicals and is a fully saturated cyclic hydrocarbon resin and Irganox is marketed by Ciba-Geigy and is a high molecular weight bonded polyphenol.

The thus coated web was then slit longitudinally into strips and each strip was then slit longitudinally so as to provide a plurality of pressure sensitive tapes of width 6 mm.

Amorphous ribbons of $Co_{70.5}Fe_{4.5}Si_{10}B_{15}$ alloy were prepared by melt spinning in air followed by annealing for about 20 hours at a temperature of 380° C. in an applied magnetic field of about 0.3 Oersteds directed parallel to the ribbon axis. As a consequence, an antiferromagnetic film was formed on the alloy substrate which was magnetically exchange coupled with the substrate. The resultant ribbons exhibited asymmetrical hysteresis characteristics and responded to applied interrogation fields by producing narrow high amplitude pulses which were easily detectable.

The ribbons were about 1.2 mm wide and 40 $\mu$m thick and were adhered to the middle of the adhesive coated surfaces of the tapes as they were being formed from the strips to form tagging material comprising a continuous length of tape having adhered thereto a continuous length of electromagnetic sensor material. The tagging material was then traverse wound onto cores to provide reels carrying continuous lengths of tagging material of about 25,000 metres long.

The tagging material was subsequently fed from the reel along a path converging with the path of a plurality of moving articles and tags were cut from the tagging material and adhered to the articles by the adhesive by the method described with reference to the accompanying drawings.

BRIEF DESCRIPTION OF THE DRAWINGS

For a better understanding of the invention and to show how the same may be carried into effect, reference will now be made, by way of example, to the accompanying drawings in which.

In the drawings corresponding parts are denoted by like reference numerals.

DESCRIPTION OF THE PREFERRED EMBODIMENTS

Figure 1:
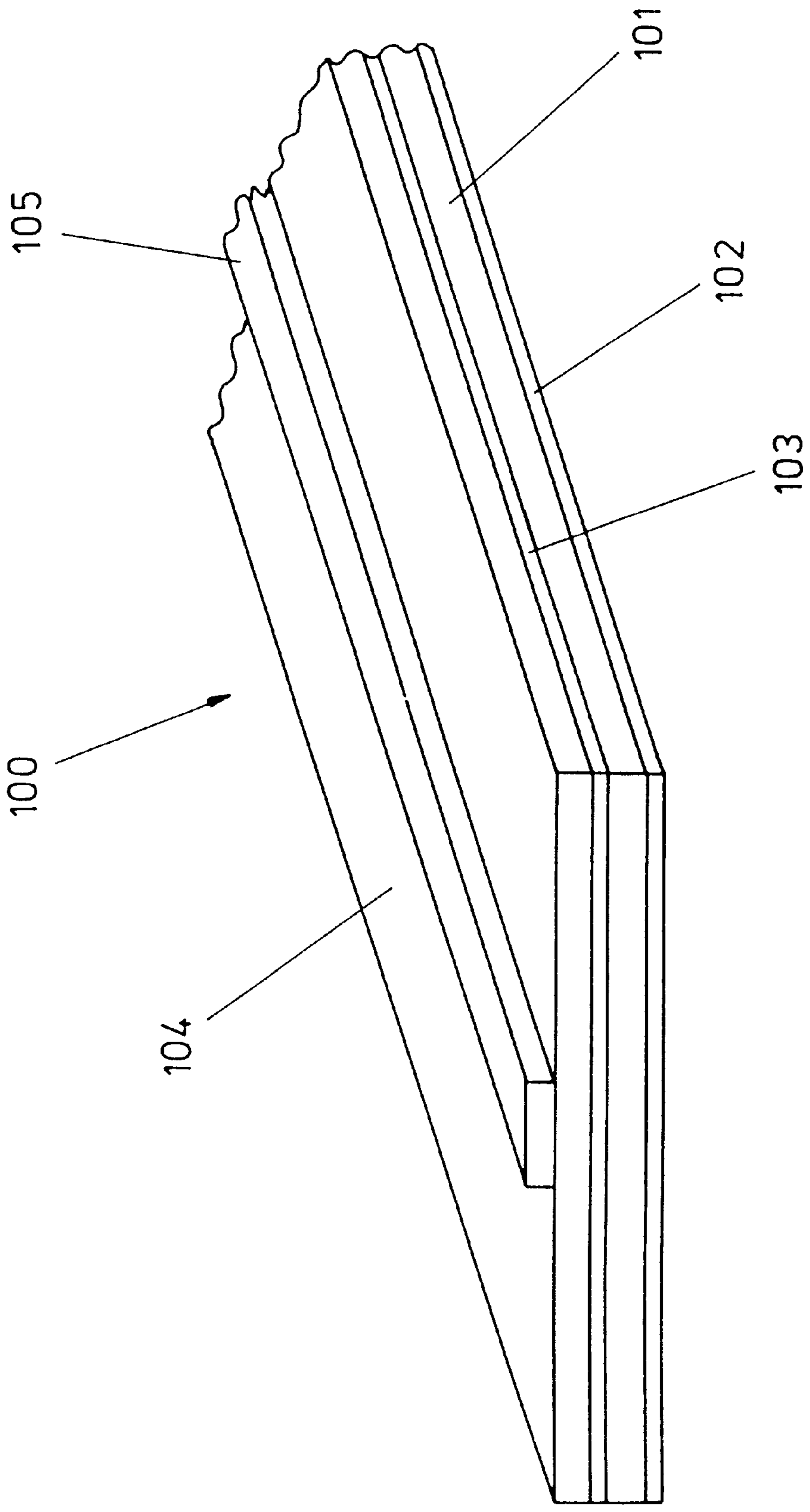
FIG. 1 is a schematic view of one embodiment of a tagging material of the invention.

Referring to FIG. 1, there is shown, in diagrammatic form, part of a continuous length of tagging material 100 as produced in the foregoing Example. The material comprises a substrate in the form of a film 101 of monoaxially oriented polypropylene coated on one surface with a layer 102 of polysiloxane release agent and on the other surface with a primer layer 103 of cross-linked natural crepe rubber. The primer layer 103 was then coated with a layer 104 of pressure sensitive adhesive composition comprising a mixture of natural crepe rubber and tackifying resin. Finally, an amorphous ribbon 105 of $Co_{70.5}Fe_{4.5}Si_{10}B_{15}$ alloy was adhered to the pressure sensitive adhesive composition in such a way that sufficient adhesive was available to enable the tagging material to be self-wound on a reel (with adjacent convolutions adhered together by the adhesive) and to enable tags formed from the tagging material to be adhered to the article to be tagged.

Figure 2:
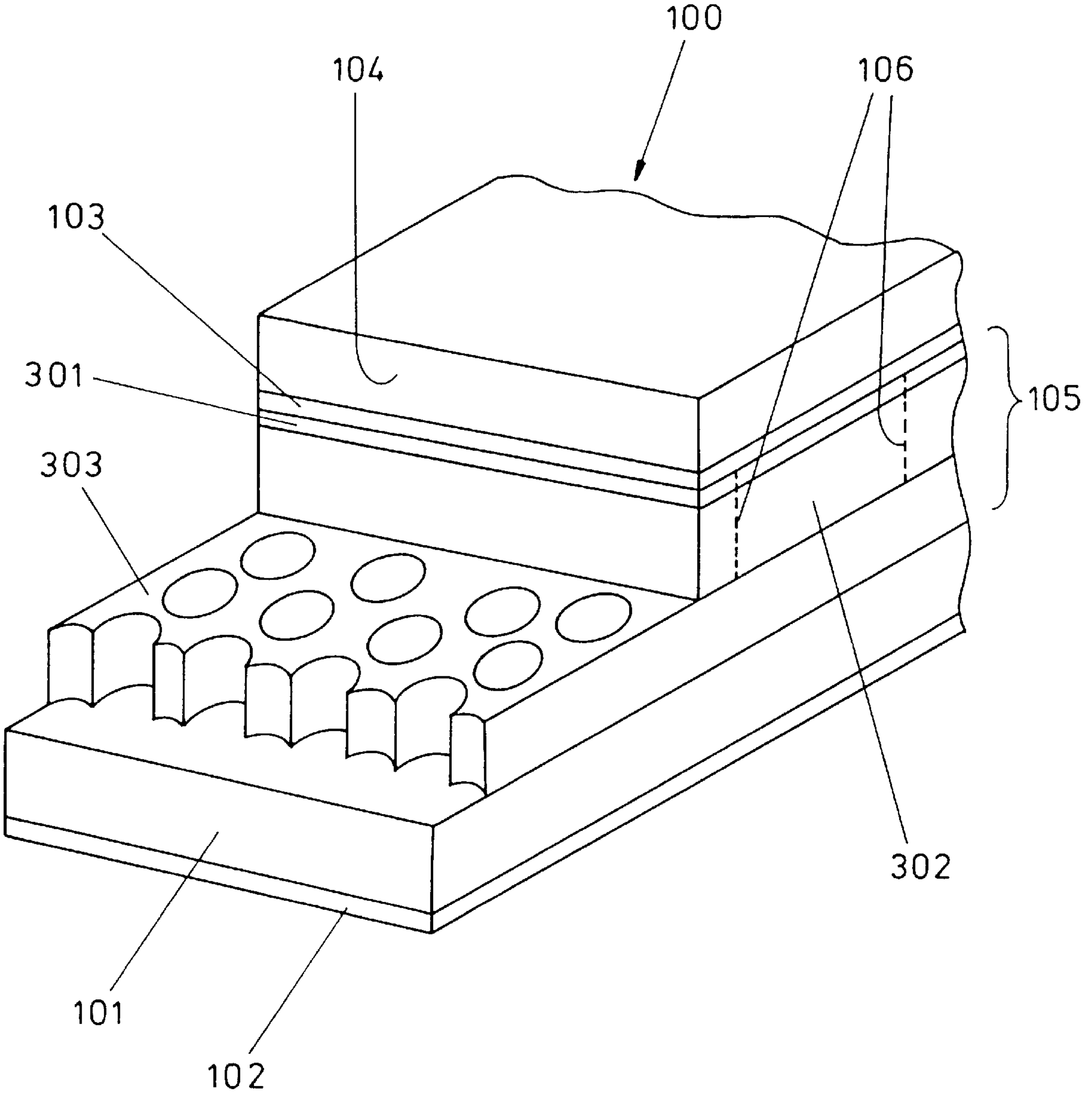
FIG. 2 is a schematic view of another embodiment of a tagging material of the invention.

Referring to FIG. 2, there is shown part of a continuous length of another tagging material according to the invention. Here the sensor material comprises a thin metal layer 301 metallised onto a polyester film 302 to give a metallised film of thickness about 50 $\mu$m with the other surface of the film 302 adhered to a perforate metal film 303 of thickness about 35 $\mu$m. Transverse cuts 106 are provided at intervals of about 6 mm through layers 301 and 302 to enhance the signal. The metal film 303 is laminated to one surface of the substrate 101 and the other surface is coated with silicon release agent 102. Primer 103 is applied to the metal layer 301 followed by the pressure sensitive adhesive composition 104. The metal layer 301 is the layer detected by the detection equipment and the perforate metal film 303 provides the material with switching properties. As in FIG. 1, the tagging material 100 can be self-wound onto reels in long lengths.

Figure 3:
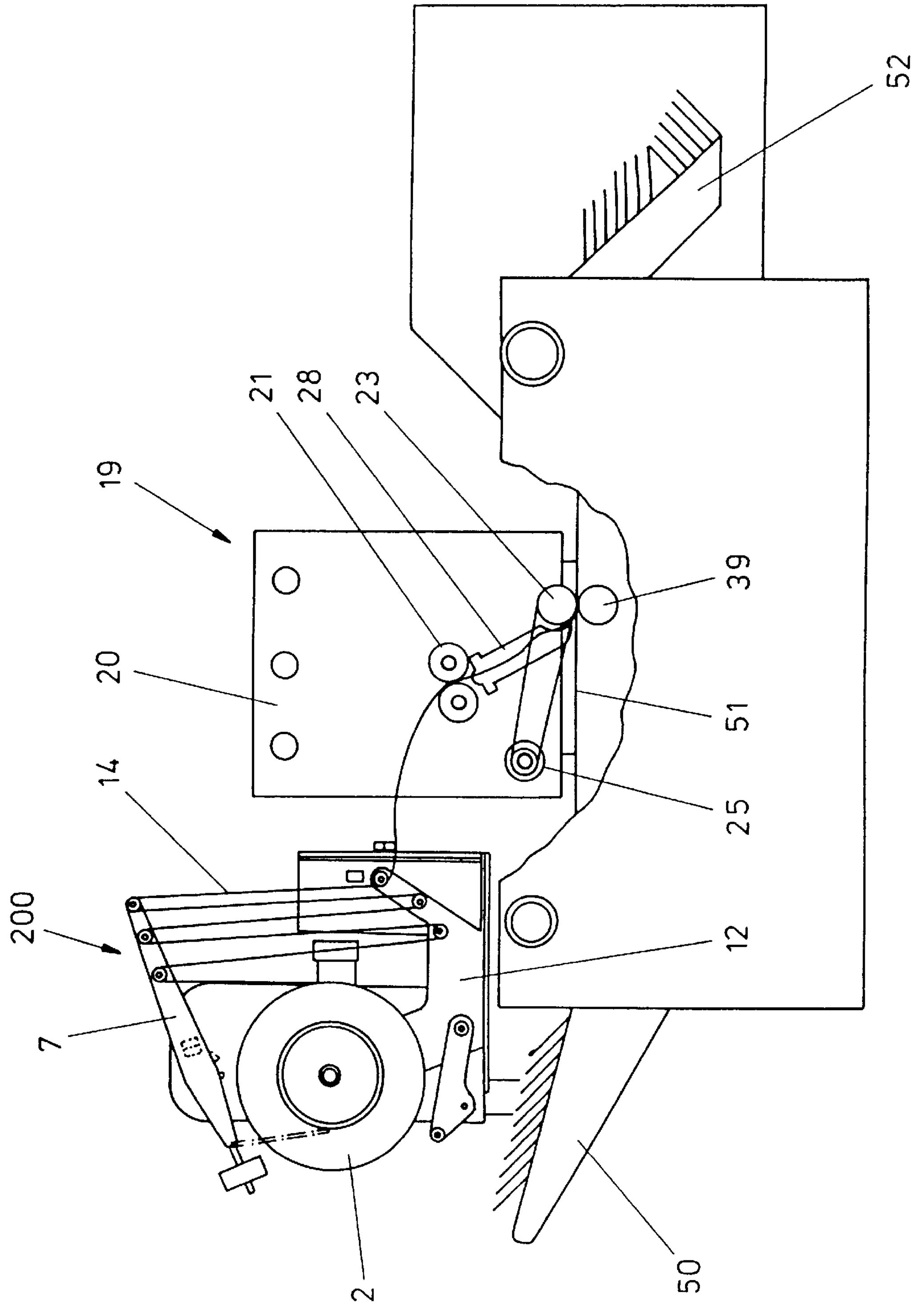
FIG. 3 is a schematic front elevation of one embodiment of an apparatus in accordance with the present invention for producing and applying a tag to an article in the form of a label for a bottle of spirits.
Figure 4:
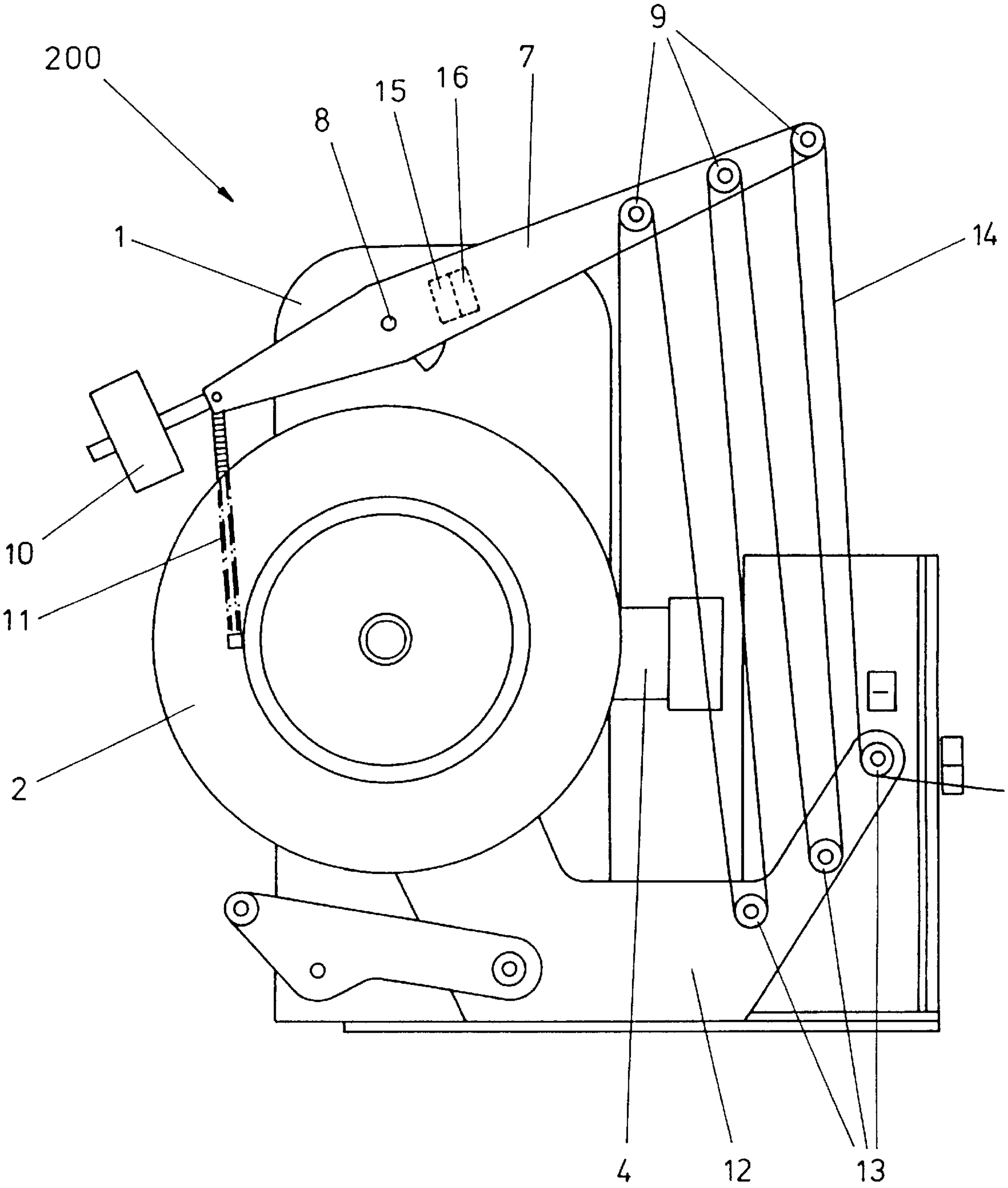
FIG. 4 is a schematic front elevation of a part of the apparatus of FIG. 3 comprising a means of feeding tagging material to an applicator head for cutting tags from the tagging material and applying the same to an article in the form of a label for a bottle of spirits.
Figure 5:
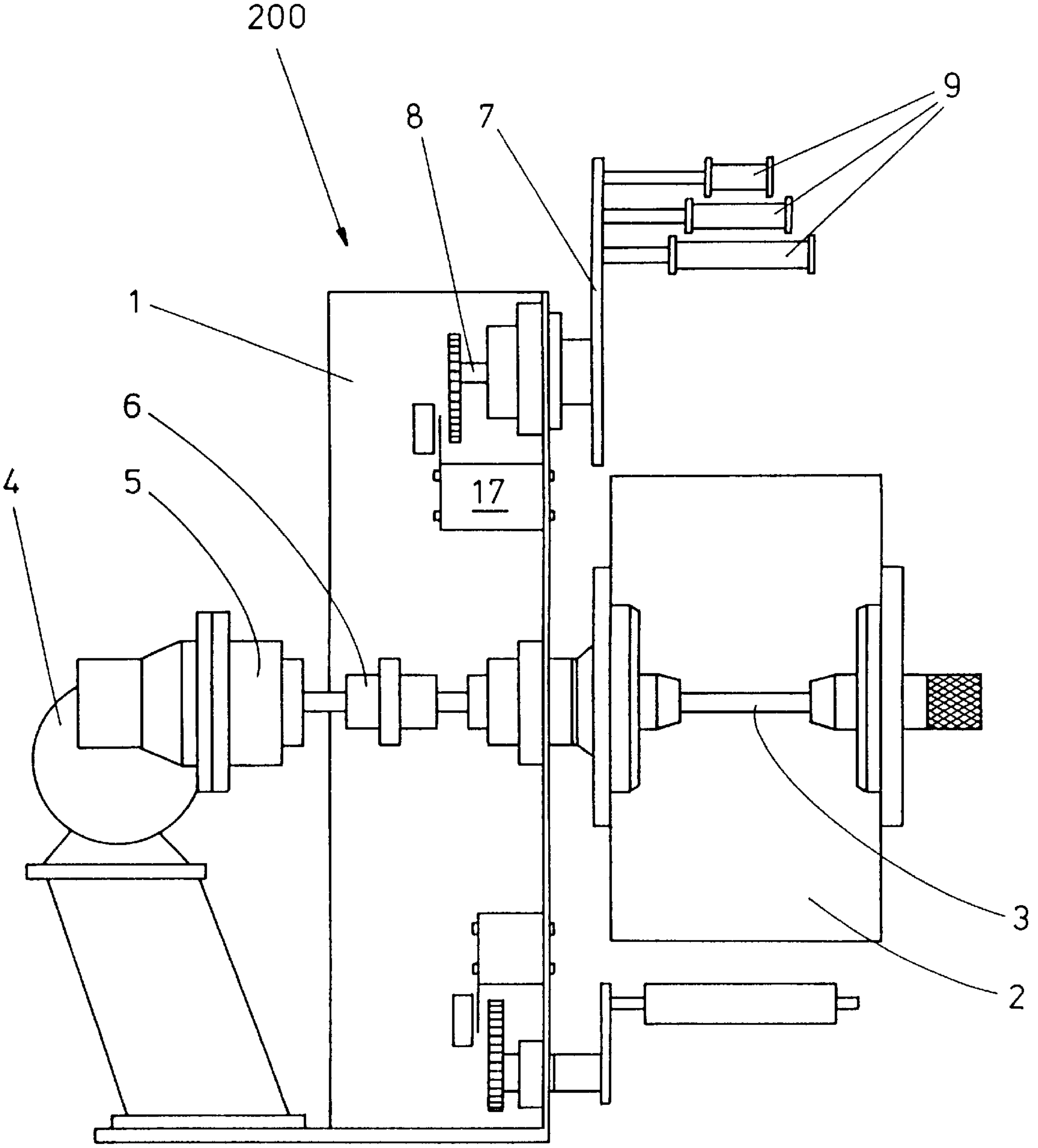
FIG. 5 is a schematic front elevation of the feeding means of FIG. 4.
Figure 6:
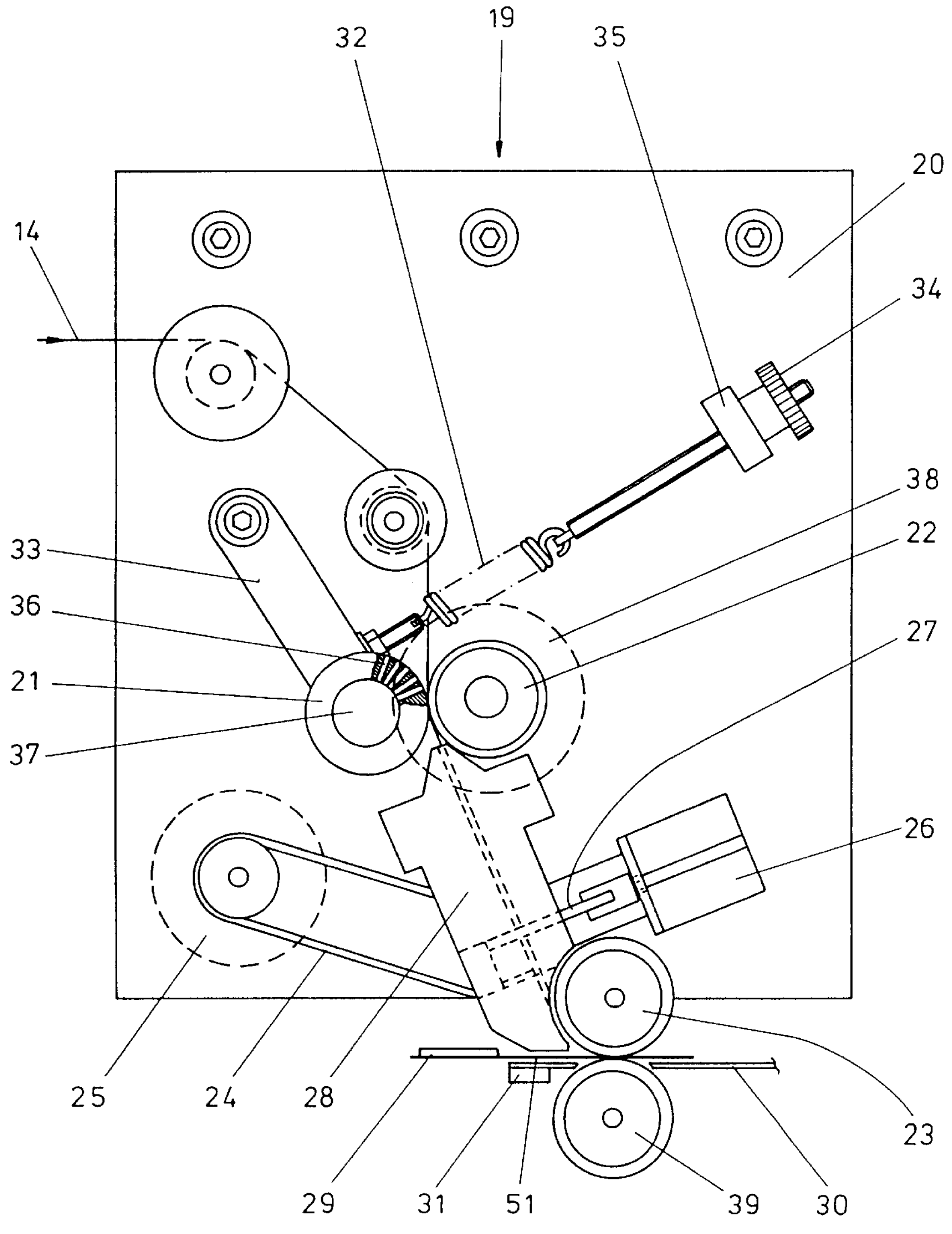
FIG. 6 is a schematic side view of another part of the apparatus of FIG. 3 comprising an applicator head for receiving tagging material from the feeding means of FIGS. 4 and 5, cutting tags from the tagging material, and applying the tags.
Figure 7:
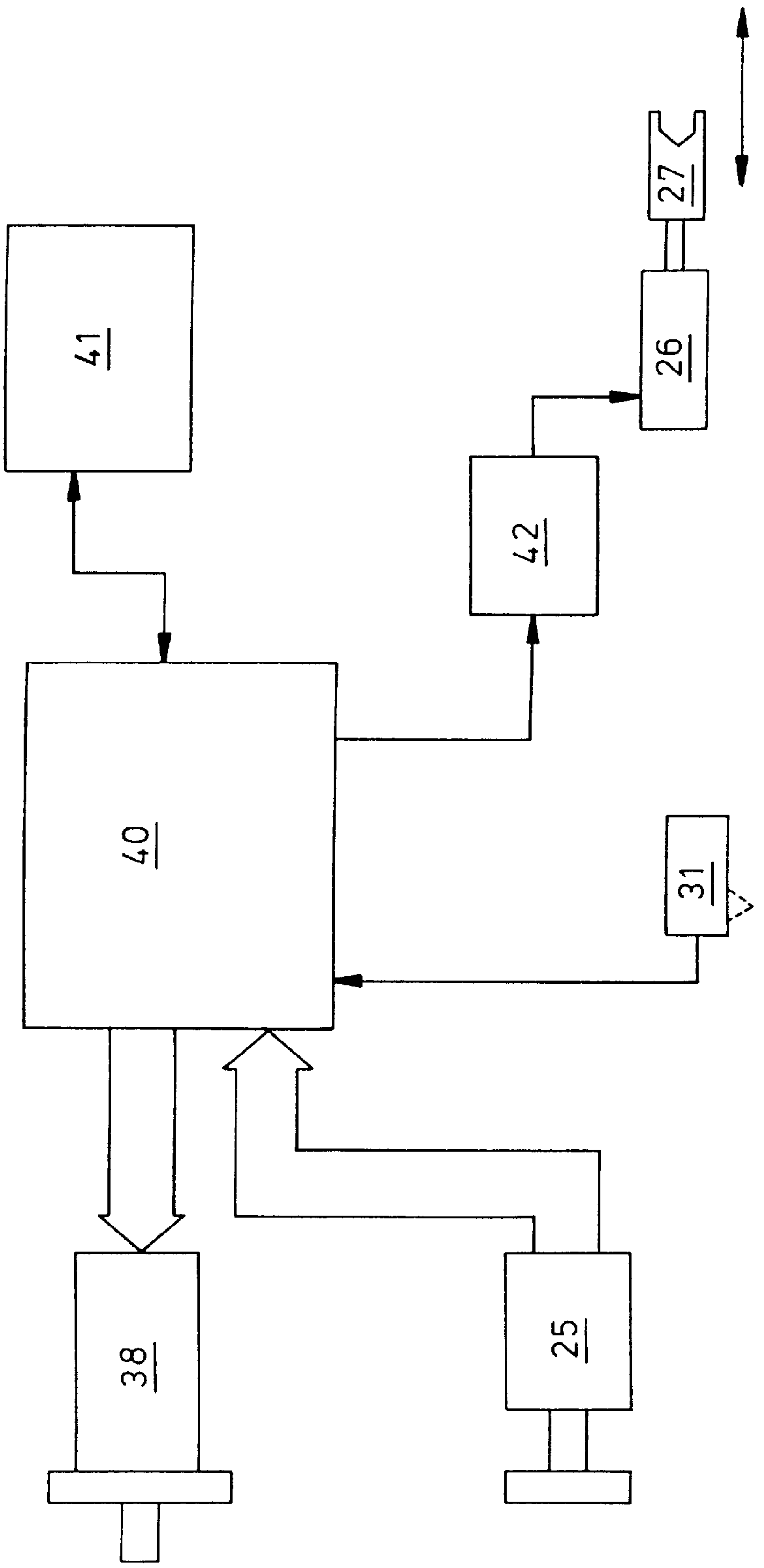
FIG. 7 is a block diagram illustrating the control circuit of the applicator head of FIG. 6.

Referring to FIGS. 3 to 7 of the drawings, and particularly to FIGS. 4 and 5, there is shown a means 200 for feeding the tagging material to the applicator head of the apparatus. The means 200 comprises a frame 1 on which is mounted a reel 2 of tagging material according to the first aspect of the invention. The reel is rotatable about an axis 3 by a geared variable speed AC/DC motor 4, an electromagnetic clutch/brake mechanism 5, and a coupling 6 all mounted on the frame 1. (In the case where only small reels are being used, the geared motor 4 is unnecessary and the tagging material can merely be drawn off from the reel 2 without the reel being motorised). An accumulator arm 7 is mounted for pivotal movement on shaft 8 mounted for rotation on the frame 1. Three guide rollers 9 are provided at a first end of the arm and an adjustable balance weight 10 is provided at the second end of the arm. The second end of the arm is also secured to the frame 1 by means of a tension spring 11. The frame also carries a lower fixed arm 12 upon which are mounted three guide rollers 13. The tagging material follows a zig-zag path 14 from the reel 2 around the guide rollers 9 and 13 and thence to the applicator head 19 (FIG. 6). The tagging material is twisted through 180° about its longitudinal axis between each pair of adjacent guide rollers so that the pressure sensitive surface of the material does not come into contact with any of the guide rollers. Tension is imparted to the tagging material by resistance to downward movement of the arm 7. The adjustment of the tension is by appropriate positioning of the balance weight 10 on the arm. The arm 7 tends to move downwardly (shaft 8 rotating clockwise) in response to demand for tagging material from the applicator head 19. As the arm moves downwards, a sensing plate covers a first proximity switch 15 which switches on the motor 4. With further demand for tagging material from the applicator head, the arm 7 moves further downwardly so that the sensing plate activates a second proximity switch 16 which engages the clutch and releases the brake of mechanism 5. The reel is now able to be driven by the motor 4. The shaft 8 for the accumulator arm 7 carries a spur gear engaged with a pinion on the shaft of a potentiometer 17 and further downward motion of the arm 7 causes the potentiometer to increase the motor speed accordingly. When the demand from the applicator head decreases, the arm 7 moves upwardly and operates the proximity switch 16 which disengages the clutch and hence the drive from the motor 4 to the reel 2. This additionally has the effect of lengthening the path of the tagging material to accommodate the lack of demand for tagging material from the applicator head. Also because the clutch is disengaged, the speed of rotation of the reel 2 tends to decrease during this time. In this way, the tension in the tagging material is effectively reduced and the material is fed to the applicator head at a controlled predetermined tension.

The tagging material is fed by the feeding means to the applicator head shown in FIG. 6. The applicator head comprises a frame 20 upon which is mounted a pair of feed rollers 21 and 22 which co-operate to form a nip through which the tagging material path 14 passes. The feed roller 21 is mounted on an arm 33 pivotally secured to the frame 20. The nip pressure between feed rollers 21 and 22 is controlled by spring 32 having one end secured to the arm 33 and the other end secured to an adjustment screw 34 threadedly engaged in a lug 35 attached to the frame 20. The feed roller 21 is coated in a suitable material to prevent the pressure sensitive adhesive composition of the tagging material from sticking to it. Also, the feed roller 21 includes a plurality of radial bores 36 communicating with axial bore 37 connected to a supply of compressed air so that air can be blown out of the bores 36 to lift the tagging material off the roller surface. The feed roller 22 is formed of rubber to produce a positive nip. Also mounted on the frame 20 is a stepper motor 38 for driving the feed rollers 21 and 22. Mounted on the frame 20 is a tag-applying roller 23 which forms a nip with a roller 39 which is driven at line speed i.e. at a speed corresponding to the speed at which labels are passed through the apparatus. The tag-applying roller 23 includes a coaxially arranged pulley which receives a drive belt 24 connecting the pulley to a drive pulley of an incremental encoder 25 also mounted on the frame 20. A pneumatic cylinder 26 controlled by a solenoid valve 42 and a severing means in the form of a guillotine 27 actuated by the pneumatic cylinder 26 are also mounted on the frame. Located between the nip of the feed rollers 21 and 22 and the guillotine 27 is a chamber 28 through which air is blown in a direction from the feed rollers 21 and 22 towards the guillotine 27 and tag-applying roller 23 by a means not shown. Thus, the path 14 of the tagging material through the applicator head passes through the nip between feed rollers 21 and 22, through the chamber 28, through the guillotine 27 and to the tag-applying roller 23. A support plate 30 is located beneath the tag-applying roller 23 and includes a photoelectric proximity sensor 31. The incremental encoder 25, pneumatic cylinder 26, solenoid valve 42, and the proximity sensor 31 are all operably linked together by a control circuit (shown in FIG. 7) including a programmable controller 40 and an operator interface 41.

The tagging material feeding means and the applicator head form part of the apparatus for producing and applying tags to labels shown in FIG. 3. The apparatus includes a hopper 50 to receive a stack of labels and feed them individually to a conveyor belt 51 running at line speed. The belt 51 carries the labels past the applicator head and then to label stacker 52. More particularly, a plurality of labels 29, face down, is caused to move in succession along an article path defined by belt 51. The sensor 31 is connected to a programmable input of the controller 40 and detects the presence of the leading edge of a label 29 passing along the path. At this stage, as a consequence of a previous tag-applying cycle, the free end of the tagging material is located just above the running nip defined by tag applying roller 23 and conveyor belt 51 and is maintained in this position by the flow of air passing through the chamber 28. The incremental encoder 25 has previously been programmed by the controller 40 to control the stepper motor 38 for the feed rollers 21 so that the feed rollers 21 and 22 rotate so as to feed a predetermined controlled length (e.g. 38 mm) of tagging material through the chamber 28 and guillotine 27 and to the nip between the tag-applying roller 23 and the belt 51. It is preferred that the feed rollers 21 and 22 feed a length of tagging material through the severing means which is slightly in excess of the distance between the severing means and the nip between the tag applying roller 23 and the belt 51. In this way, the tagging material exhibits a slight curve which facilitates cutting of the material to form the tag. When the leading edge of the label 29 has been detected by the sensor, the stepper motor 38 is accelerated up to line speed by the time the free end of the tagging material has contacted the label 29 and then continues to move at line speed until the predetermined length of tagging material has been fed to the label. When the predetermined length has been fed, the controller 40 sends an output signal to the solenoid valve 42 of cylinder 26 which operates the guillotine 27 to cut the tagging material. The controller 40 receives a signal from the incremental encoder 25, driven by the tag applying roller 23, and references all speeds and distances of the tagging machine to the encoder. The operator interface 41 enables communication to occur between the operator and the programmable controller. It prompts the operator for motion parameters such as tag length, batch count, acceleration rate, etc. Thus, under the influence of the encoder 25, the motor 38 feeds the desired amount of tagging material to the nip between tag applying roller 23 and the belt 51 so that when the guillotine 27 is actuated by the pneumatic cylinder 26 (under control of the control circuit) a tag of the desired length is cut from the tagging material. As the label and the severed tag are drawn through the nip between the tag-applying roller 23 and belt 51 the tag is firmly adhered, by its adhesive, to the underside of the label 29 on the belt 51.

After the tag has been cut off, the tagging material is continued to be advanced by the motor 38 (i.e. by the predetermined length) so that the free end of the tagging material is at a point just in front of the free running nip formed by tag applying roller 23 and belt 51 (i.e. the preparation stage). Also the distance between the end of the tagging material and the free running nip 23, 51 needs to be proportional to the acceleration of the stepper motor 38 feeding the tagging material through the nip between the feed rollers 21 and 22 if accurate placement of the tag on the underside of the label is to be ensured.

The tagging cycle is repeated when the next label is detected. Thus, the apparatus enables tags to be applied to the labels automatically and at high speed.

Subsequently, the label with the tag attached to its underside is secured to the bottle in conventional manner. Thus, the tag is located between the bottle and the label and hence is not visible.

In use, the tag is in its activated state whilst the bottle is in the store. Ordinarily, the tag is deactivated by the cashier at the point of sale by subjecting it to an appropriate magnetic field. In the event that an attempt is made to avoid the cashier the tag will still be activated and thus it will be detected by the detecting equipment between the point of sale and the exit of the store.

Instead of detecting the leading edge of the label 29 by proximity sensor 31, register marks on the label could be detected.

Preferably the applicator head is mounted in such a way that it may be moved, by means of a second stepper motor (not shown) similar to motor 38, transversely with respect to the conveyor belt 51 whereby the relative orientations of the tagging material path and the article path may be varied. Thus the tag applied to a particular label is transversely offset with respect to the tags applied to the adjacent labels. Moreover, by suitably programming the controller 40, the location at which a tag is adhered to the label can be varied in the direction in which the label moves along the path so that adjacent tags are longitudinally offset with respect to one another. In these ways the additional thickness given to the labels by the tags causes less of a problem when the labels are stacked together.

Figure 8:
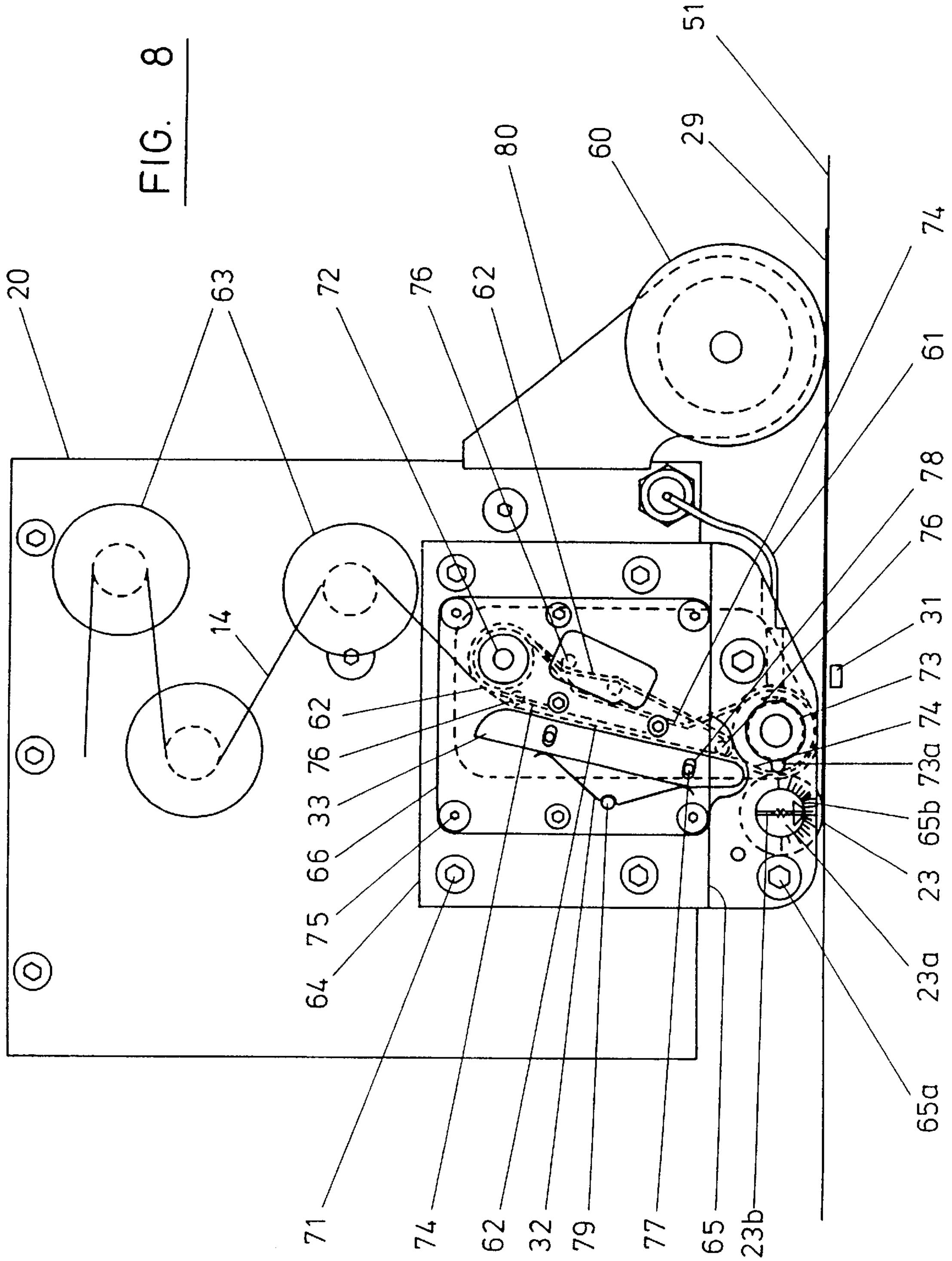
FIG. 8 is a schematic front elevation of an applicator head of another embodiment of an apparatus for producing and applying a tag in accordance with the present invention.

Referring now to FIG. 8, the applicator head includes a frame 20 in the form of a back plate to which are secured modular sub-assemblies 64 and 66. The back plate 20 has guides 63 secured thereto to define the tagging material path 14.

The sub-assembly 64 includes a housing secured to the back plate by means of a plurality of screws 71. The housing has mounted therein a drive roller 72 (driven by a stepper motor similar to motor 38 but not shown in the interests of clarity) and a cutter roller 73 having a cutting edge 73*a* and drivingly linked to drive roller 72 by a drive belt 74. (More than one cutting edge may be provided on cutter roller 73 if desired). Also mounted within the housing of subassembly 64 is a metal roller 23 which is harder than the cutting edge(s) of the cutter roller 73 and which co-operates therewith to cut the tagging material. Metal roller 23 also serves as the tag applying roller.

A cover plate 65 is secured to the housing 64 by screws 65*a* and holds the assembly of metal roller 23 and cutter roller 73 together. The roller 23 is mounted for rotation about a shaft terminating in an eccentrically mounted disc 23*a* rotatably located in the cover plate 65 and having a slot 23*b*. By inserting a screwdriver in slot 23*b* the disc 23*a* can be rotated whereby the roller 23 can be moved towards or away from the cutter roller 73. This is used when setting up the apparatus to ensure that the distance between the rollers 23 and 73 is correct and to compensate for cutter wear from time to time. The cover plate 65 carries a scale 65*b* whereby the amount of wear of the cutting edge(s) can be visually indicated.

The sub-assembly 66 includes a housing secured to the housing of sub-assembly 64 by screws 75. Within the housing of sub-assembly 64 is a transport belt 62 passing around roller 72 and guides 76. The transport belt 62 is made from silicone rubber material having good release properties with respect to the pressure sensitive adhesive composition of the tape and co-operates with a shoe in the form of top plate 33 formed from polytetrafluoroethylene to define the tagging material path through the applicator head. The shoe is secured in the housing by means of screws 77 passing through slotted holes 78 in the shoe so as to allow the shoe limited movement perpendicularly to the transport belt 62. A spring 32 is mounted on a peg 79 so as to resiliently urge the shoe towards the transport belt 62. In use, the tape passes through the applicator head with its non-adhesive surface adjacent to the shoe. (If desired the shoe may be replaced by a second transport belt similar to transport belt 62.) Because both drive belt 74 and transport belt 62 are driven by drive roller 72, the cutter roller 73 stops and starts as the tagging material feed means stops and starts. More particularly the feed rate of the tagging material and the time of the cutting action are fixed relative to one another and the length of the tag cut from the tagging material is dependent on the radius of the cutter roller 73 and the number of cutting edges on the cutter roller 73.

The applicator head includes a bracket 80 attached to the backplate 20 and a rubber coated wheel 60 is mounted for rotation on the bracket 80 in a location where it contacts the surface of the label 29 passing along the article path 51. The coated wheel 60 detects the speed at which a label is passing along the path 51 and causes an appropriate signal to be transmitted to the motor driving the roller 72. This signal, in combination with the signal from the photoelectric proximity sensor 31, ensures that at the appropriate time, tagging material is fed through the applicator head and a tag is cut therefrom by the cutter roller 73 whereby, when the label 29 reaches metal roller 23, the tag is in position ready to be adhered to the label 29 as the tag and label 29 pass between the metal roller 23 and an underlying roller (not shown) similar to roller 39 of FIG. 6. The underlying roller may be a part of the line to which the apparatus is fitted.

If desired, the signal related to the speed of the label may be generated from elsewhere (for example from a production line or packaging line to which the tag applying means is fitted).

In use, tagging material from a tagging material feeding means (such as described in FIGS. 4 and 5) is fed into the applicator head along path 14. More particularly the tagging material passes around guides 63 and enters the nip between the shoe 33 and the transport belt 62 with its adhesive side adjacent the belt 62. The free end of the tagging material is ordinarily adjacent the nip of cutter roller 73 and metal roller 23 as a consequence of a previous tagapplying cycle. The presence and speed of a label 29 passing along path 51 are detected by the coated wheel 60. The drive motor for drive roller 72 is then appropriately actuated to accelerate the transport belt 62 so as to feed tagging material through the nip between cutter roller 73 and metal roller 23 and cut off a tag therefrom so that the tag is ready for application to the label 29 as it passes under metal roller 23.

By making use of a rotary cutter as in this embodiment, speeds of the order of 1000 tags per minute can be readily achieved. The use of a transport belt as the tagging material feed means has the advantage that it provides a self-feeding facility for introducing the tagging material into the applicator head and thence to the vicinity of metal roller 23 and utter roller 73.

If it is desired to change the length of the tag cut from the tagging material, this can be done by replacing the cutter roller 73 with another cutter roller of a different diameter or with a cutter roller having a different number of cutting edges. Alternatively, however the facility to vary the length of the tag can be achieved by providing a separate motor (not shown but, for example similar to stepper motor 38) to drive the cutter roller 73 instead of mechanically linking the speed of the cutter roller 73 to the speed at which the tagging material is fed through the applicator head. The separate motor is operably connected to the controller 40 (FIG. 6) and the control circuit otherwise resembles the circuit of FIG. 6 with the omission of solenoid 42, pneumatic cylinder 26 and guillotine 27. In this way the cutter roller 73 can be accelerated from its rest position to a position at which its cutting edge severs a tag of desired length from the tagging material, the cut length being a function of the rotation of the cutter roller 73 and the feed speed of the tagging material through the applicator head.

When the apparatus is first switched on, the cutter edge 73*a* needs to be in the "armed" position so that its location is known to the controller 40. This position can be achieved by means of a sensor or other signal (for example via cable 61 shown in FIG. 8).

Figure 9:
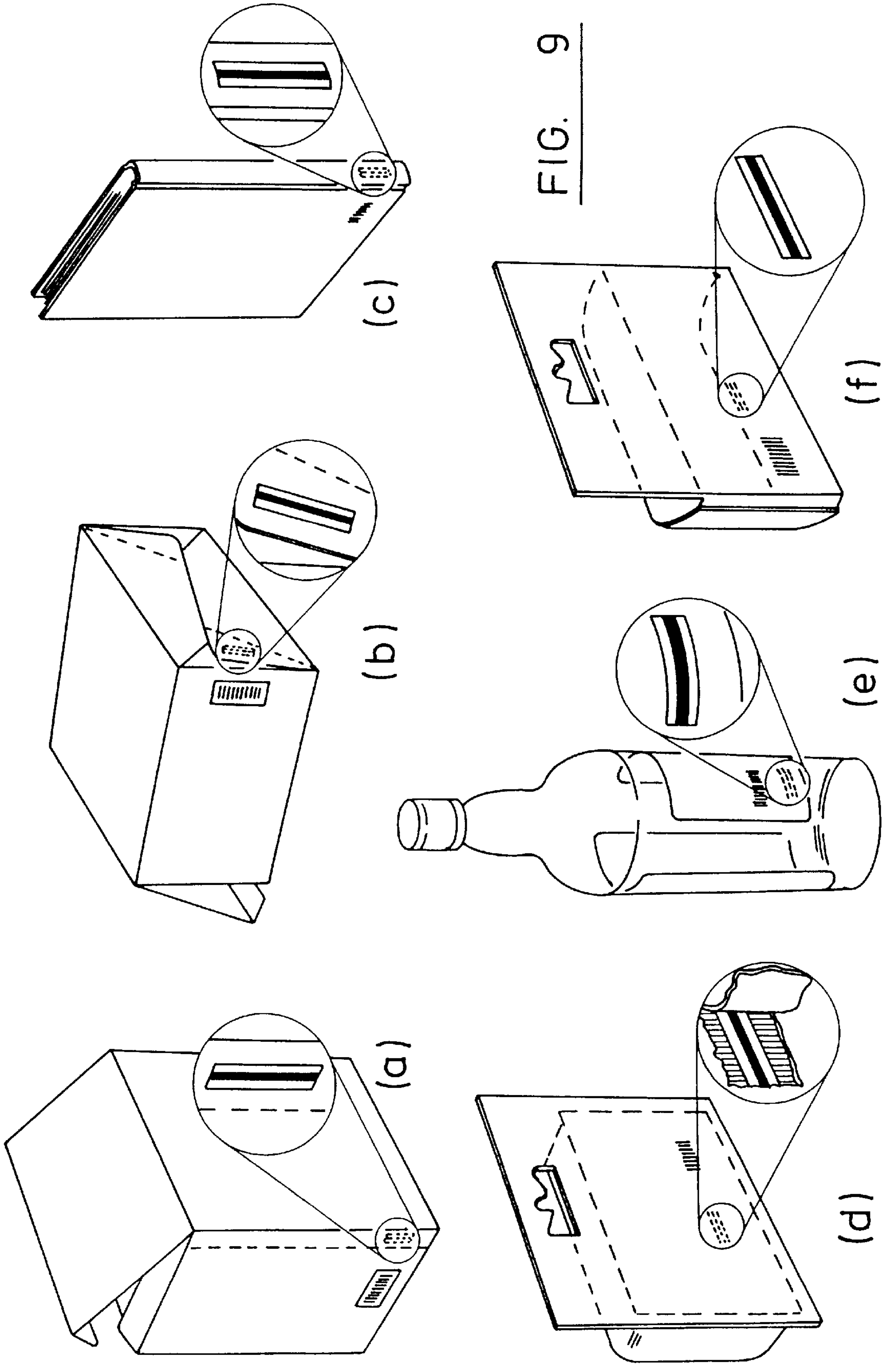
FIG. 9 shows perspective views of articles incorporating tags in accordance with the invention.

Referring now to FIG. 9, there are shown various articles including tags (400), formed from tagging material in accordance with the invention, at various locations. In each case, the tag is also shown on an enlarged scale.

In FIG. 9(*a*) the tag is located within a glued seam of a carton and FIG. 9(*b*) shows a tag incorporated in the crash lock of a carton. FIG. 9(*c*) shows a tag included on the inner surface of a book spine and FIG. 9(*e*) shows the tag located between a bottle and a label adhered to the bottle, the tag having been previously attached to the label in the manner shown in FIGS. 3 to 8. Alternatively, the tag could have been applied directly to the bottle and then covered by the label. In FIG. 9(*d*) the tag is incorporated between the two boards forming the rear of a conventional blister pack and FIG. 9(*f*) shows the tag located on the inside of a blister board pack.

Although the invention has been particularly described with reference to the off-production line application of tags to labels for bottles of spirits, it can be used in a production line system applying tags directly to bottles on a filling line just prior to the label being applied so that the tag is covert or in a packaging production line system applying tags to the side seams or crash locks of boxes on, for example, a folder/gluer machine or in a packaging production line system applying tags at predetermined positions within a fibreboard construction on, for example, a laminating machine. The packaging can then be used for such products as cigarettes, high value confectionery, Do-It-Yourself items, and health and beauty products.

What is claimed is:

1. Tagging material for the production of a tag for securing to an article to enable the presence of the article to be detected, and comprising tape having a first surface coated with pressure sensitive adhesive and a second surface opposite the first surface coated with a release agent, the tape including a continuous substrate of synthetic plastics material, and a continuous flat ribbon of electromagnetic sensor material capable of being detected by detection equipment, said ribbon being located on the same side of said tape as said pressure sensitive adhesive, said tape being self and traverse wound.

2. Tagging material as claimed in claim 1, wherein the flat ribbon comprises at least a continuous metal layer and a perforate metal film adhered to said substrate.

3. A tagging material as claimed in claim 1, wherein the substrate is a film of oriented synthetic plastics material having a thickness of from 30 to 60 microns and a width of from 2 to 10 mm.

4. A tagging material as claimed in claim 3 wherein the film is of monoaxially oriented polypropylene.

* * * * *